(12) United States Patent
Wheeler

(10) Patent No.: US 6,373,385 B1
(45) Date of Patent: *Apr. 16, 2002

(54) DETERRENT DEVICE

(76) Inventor: Timothy Waite Wheeler, P.O. Box 8228, San Jose, CA (US) 95155

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/733,301
(22) Filed: Oct. 17, 1996
(51) Int. Cl.[7] ............................................... G08B 13/00
(52) U.S. Cl. ................. 340/541; 340/573.1; 340/691.7; 116/22 A; 222/61
(58) Field of Search ................................ 340/541, 540, 340/573.1, 693.1, 691.1, 567, 691.7; 222/61; 239/69; 116/22 A; 119/720, 719, 905

(56) References Cited

U.S. PATENT DOCUMENTS

| | | | | |
|---|---|---|---|---|
| 3,949,709 A | * | 4/1976 | Myers | 119/159 |
| 3,991,939 A | * | 11/1976 | Maclay | 239/63 |
| 4,185,581 A | * | 1/1980 | Tilton | 116/22 A |
| 4,693,419 A | * | 9/1987 | Weintraub et al. | 239/63 |
| 4,852,802 A | * | 8/1989 | Iggulden et al. | 239/64 |
| 4,991,657 A | * | 2/1991 | LeLande | 169/46 |
| 4,996,521 A | * | 2/1991 | Hollow | 340/541 |
| 5,009,192 A | | 4/1991 | Burman | 119/29 |
| 5,311,166 A | * | 5/1994 | Frye | 340/541 |
| 5,528,220 A | * | 6/1996 | Woods | 340/540 |
| 5,610,580 A | * | 3/1997 | Lai | 340/541 |

* cited by examiner

*Primary Examiner*—Jeffery Hofsass
*Assistant Examiner*—Anh La
(74) *Attorney, Agent, or Firm*—J. Nicholas Gross

(57) ABSTRACT

A water sprinkler based deterrent system is used to deter entry into landscaped areas by undesirable intruders. The system incorporates an infrared detector combined with a control circuit that is adapted to be powered from a wide range of power supplies. In this manner, the system can be easily integrated into a variety of landscape environments, including those that may or may not include a preexisting sprinkler controls system.

20 Claims, 4 Drawing Sheets

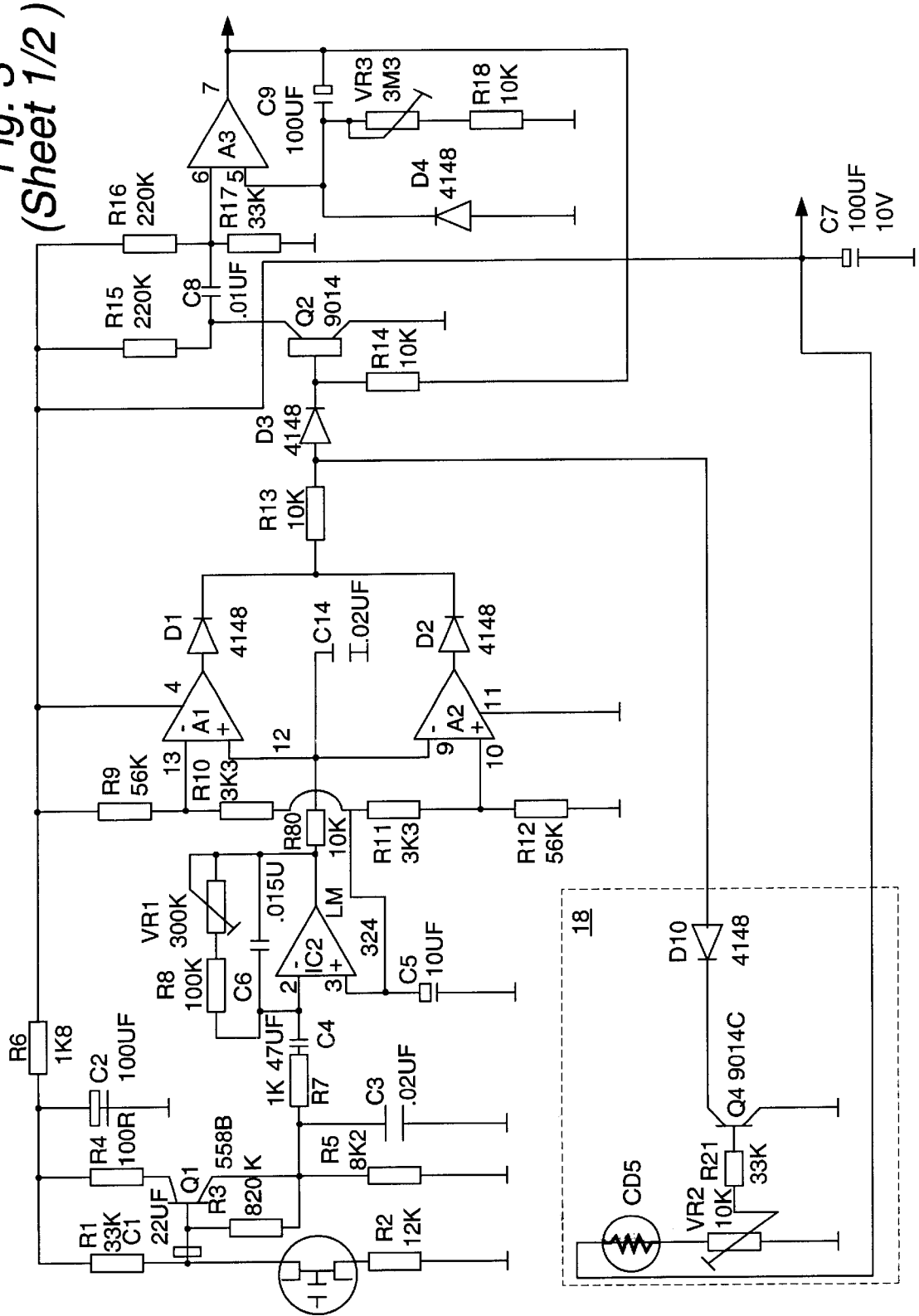
Fig. 3 (Sheet 1/2)

(Sheet 2/2)

DETERRENT DEVICE

FIELD OF THE INVENTION

The present invention relates to deterrent systems used to inhibit unauthorized intrusions into protected areas. The invention has particular applicability to applications where it is desirable to protect a landscaped area from disturbance from animal intruders.

BACKGROUND OF INVENTION

The interested area of invention pertains and relates to those specific apparatus's that deter the admittance of an un-authorized being of any form in a given designated perimeter. More specifically; the intrusion or trespassing of a private area.

A large area of the current population exhibit a need to protect their private dwellings from damage by animals and vandals. More particularly, the population exhibits a need to protect yards and expensive landscaping. Often the landscaping has a specified appearance that not only protects against the costly effects of natural erosion to soils, but also maintains and improves the marketability of the effected area. The intrusion by un-authorized beings can severely damage the appearance and structure of an individuals landscaping.

The only way to protect landscaping from such damage at present is to remain in the parameter of the affected area to provide protection, simply wait for damage to occur to the area, or use sensors that incorporate the use of some type of sprinkler controlling device. The first protection is timing. In today's society, the feasibility of remaining at a dwelling for the purpose of landscape protection simply does not exist. The second method of after the fact correction has already allowed costly and unsightly damage to occur. Lastly, the third method of landscape protection can be costly to the consumer.

The design of the current invention allows for individuals to maintain a protection of landscaping on a constant non-stop time frame with the use of a water producing apparatus that meets the required specifications, even when the dwelling is not being inhabited.

INVENTION SUMMARY

The design of the current invention is such to allow compatibility with any water irrigation device that incorporates the concept of sprinkling water in a specified area at a specified voltage of operation. The design of the current invention does not require the use of a sprinkler controlling apparatus or the use of a 110 volt power supply. The design of the current invention includes a perimeter violation sensing apparatus that is installed at strategic locations throughout the desired area at a standard level of elevation with respect to the ground. When the protected area has been violated, the sensor activates the electronic circuitry of the system which in turn will activate the water producing irrigation system of the protected area. Once the intruder notices the application of water upon itself, it will promptly exit the protected area and cause no damage to the existing landscape.

The primary objective of the current invention is to incorporate the use of a new or existing irrigation system to deter the entrance of any intruder that may cause costly damage to an individuals private landscaping.

An additional objective of the current invention is to allow the use of any irrigation device that incorporates the use of sprinkling water in specified area. The design of the current invention, in addition, disallows easy detection by would-be intruders.

Another objective of the current invention is to allow protection of landscaping at a relatively low cost to the interested consumer. The current invention allows such an objective by incorporating simple methods of operation, installation, and not requiring an expensive irrigation method of control such as an irrigation sprinkler controlling apparatus making use of a 110V power supply.

GENERAL DESCRIPTION OF DRAWINGS

FIG. 1 is an illustration of the operation of the current invention. Shown in FIG. 1 is landscaping that has been protected by the current invention. The drawing has been constructed in a three dimensional manner to illustrate the protection of the entire area of the dwelling. It is understood that the irrigation system that has been installed in FIG. 1 may be either existing or new, and that a sprinkler controlling apparatus is not required.

DETAILED DESCRIPTION OF THE DRAWINGS

Figure 1:
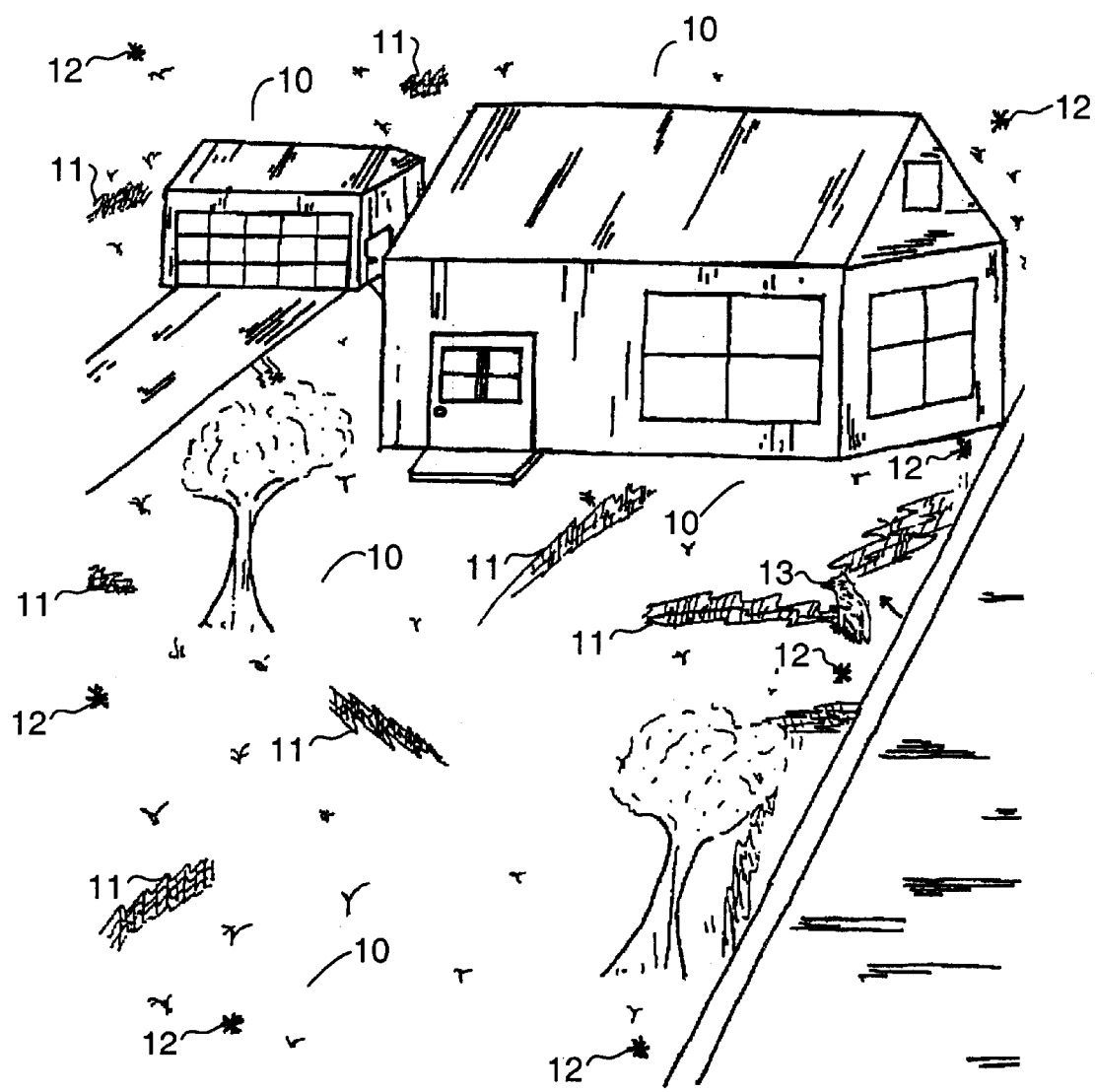
Figure 3:
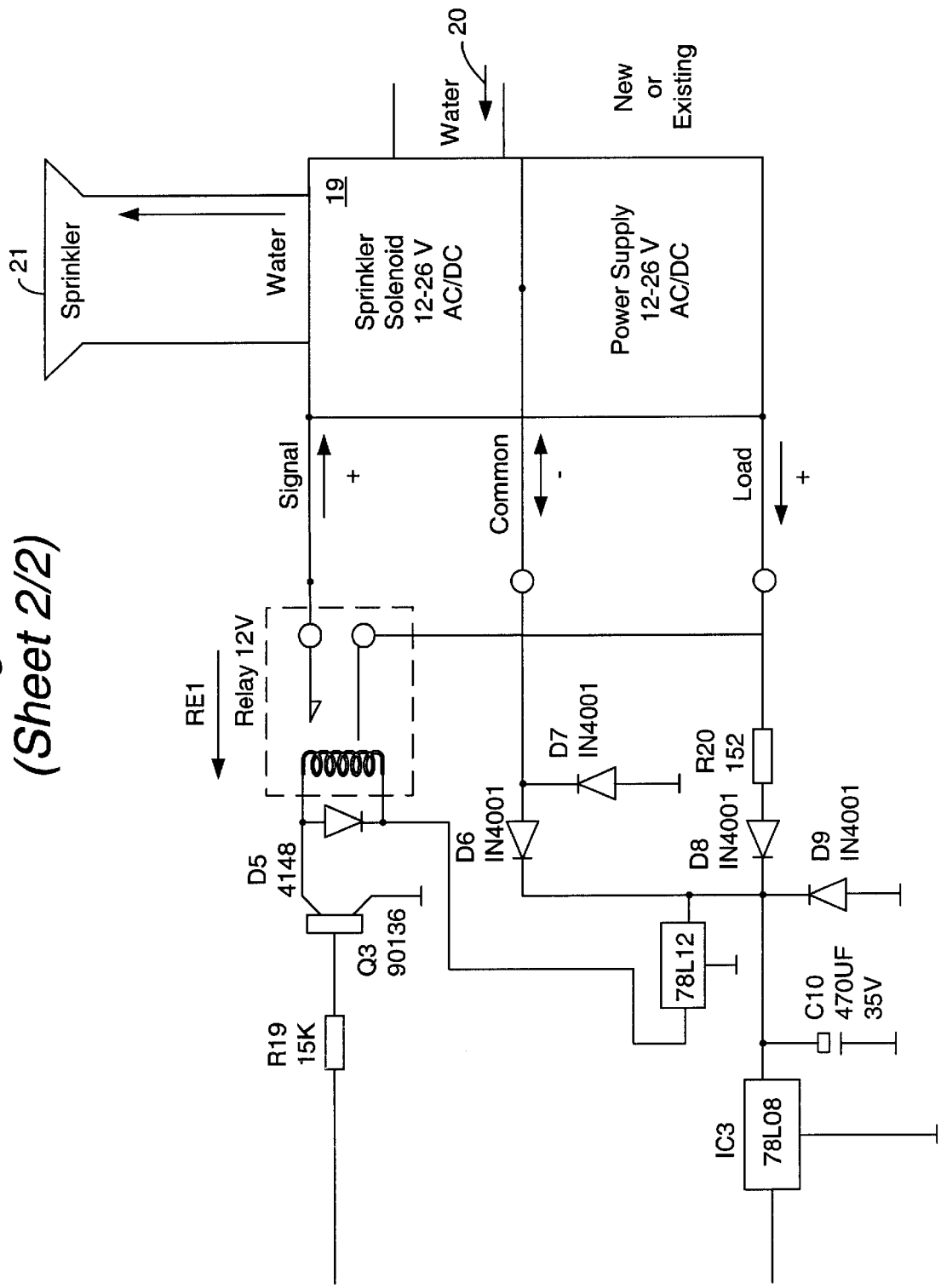
FIG. 3 is an electrical schematic diagram of the parameter violation sensing apparatus for the current invention. The current invention's circuit is primarily composed of several active and passive components including operational amplifiers and a relay.

Illustrated in FIG. 1 is a private dwelling consisting of landscaping 10, which is normally composed of, but not limited to, soil, grass, and trees. Within the protected area, sprinklers 11 have been distributed, with the necessary plumbing, in strategic locations that forbid entry. The perimeter violation sensing apparatus's 12 have been placed within FIG. 1 to disallow detection and to provide adequate protection of the desired area. FIG. 1 indicates that when the protected area has experienced a violation of its specified perimeter 13 the sprinklers 11 are immediately activated by the electrical circuit of FIG. 3 to provoke the intruder to promptly exit the protected landscape. The sprinklers 11 that have been depicted in figure one are understood to not be a direct feature of the current invention, but rather a related component that is readily available to the interested consumer. It is understood that the sprinklers depicted in FIG. 1 meet the electrical requirements of the current invention which have been indicated in FIG. 3.

Figure 2:
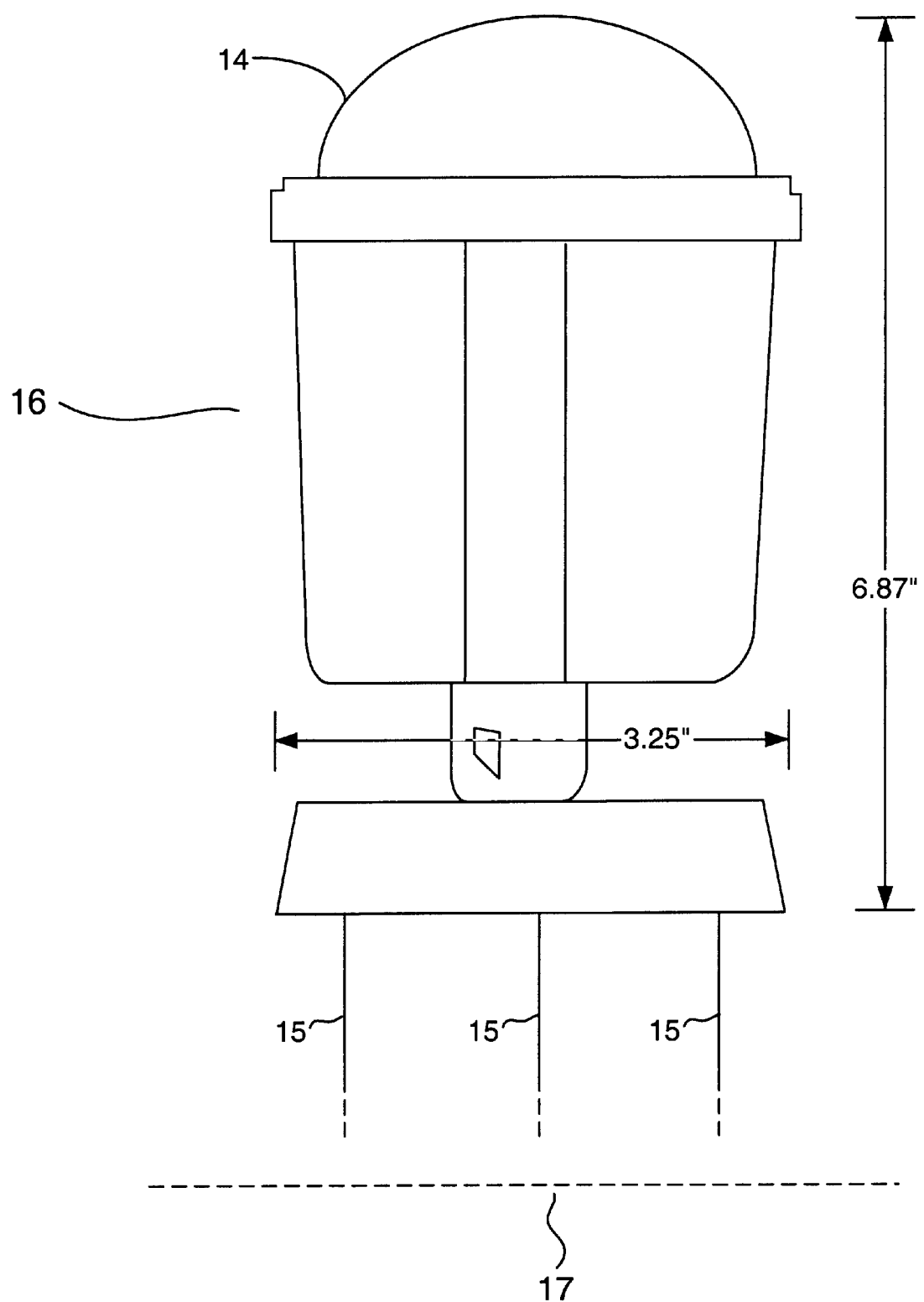
FIG. 2 is an illustration of the appearance of the external housing of the current invention including its dimensions.

Illustrated in FIG. 2 is the external housing, including dimensions of the current invention. More specifically, FIG. 2 is an illustration of the electrical circuit housing unit that oversees protection of the desired area. The infrared detector 14 has the responsibility of detecting movement in the protected area and uses a range of 110 degrees by 80 feet. The three control wires of the current invention 15 are connected further to the desired power supply and sprinkler system. The location in FIG. 2 of protected area 16 can be protected in any lighting conditions, day or night. The complete housing is connected to any sufficient stable mount 17 such as the ground.

Figure three is a schematic of the controlling circuit for the current invention. The current invention is designed to have an operating voltage between 9 and 26 AC or DC volts with a minimum sensor power consumption of 4 Watts.

Assume for the moment that heat is detected in the current invention in section 18 (FIG. 3) of the device. A chain reaction is initiated within the components of the circuit when this occurs. More specifically, a voltage is supplied to the base of Q3 and also fed through R1 to the collector of Q1 through resistor R4. Q1 then consequently flows current through the emitter and into the impedance formed by the combination of R7 and C4. An externally available potentiometer, VR1, is then used to affect increase values of voltage obtained in the inverting voltage controlled IC2 at the output terminal of IC2. A1 and A2 operational amplifiers are configured in such a way as to provide a method of timing for the circuit that is triggered when Q1 is triggered. The signals are then distributed through two forward biases diodes D1 and D2 that combine at R13. D1 and D2 provide a DC level at R13 that sends signal variations to the collector of Q4. The base of Q4 can be controlled by an externally available potentiometer VR2 that in turn controls the operating characteristics of the current invention associated with the load though 78L08, D12, and R20. The output of R13 then cycles through another forward biased diode, D3. This causes the switching of Q2 in relation to the timing. A3 is also effected by an externally available potentiometer at its non-inverting terminal. A3 is configured in a non-inverting feedback configuration for gain that supplies voltage to switch the relay RE1 through resistor R19 and transistor Q3. The diode D5 then uses 78L12 to utilize the power supply and a series of reversed biased diodes including D6,D12, and D9. When the necessary voltage level is attained, the solenoid for the sprinklers 19 that are incorporated into the system begin to supply water from the water supply 20, the overall output of the system is at location 21 consisting of the application of water to the protected area.

What is claimed is:

1. A deterrent system adapted for use with one or more sprinkler devices, said system comprising:
    a detector configured to generate an intruder detection signal when an intruder is detected within an area to be protected from intrusion; and
    a control circuit for generating a sprinkler activation signal, said sprinkler activation signal being used to control one or more water flow valves associated with the sprinkler devices, such that said control circuit causes the sprinkler devices to spray water into said area in response to said intruder detection signal; and
    said control circuit further including a voltage regulator adapted to operate with an operating voltage taken from a low voltage AC supply system and a low voltage DC supply system and which voltage regulator compensates for variations in such supply system;
    wherein said operating voltage is substantially below 110 volts, and said operating voltage can vary by more than a factor of two.

2. The system of claim 1 wherein said operating voltage can vary between approximately 9 volts and 26 volts.

3. The system of claim 1, further wherein said control circuit can be controllably adjusted to delay generation of said sprinkler activation signal.

4. The system of claim 1, further wherein said control circuit generates said sprinkler activation signal for a controllable period of time corresponding to a time that such sprinkler devices spray water into said area.

5. The system of claim 1, wherein said detector used an infrared signal for detecting movement within said area.

6. The system of claim 5, wherein said infrared signal can be used under substantially varying ambient light conditions.

7. The system of claim 1, further wherein both said detector and said control circuit are powered from said operating voltage.

8. A deterrent system adapted for use with an irrigation control system, said irrigation control system including one or more sprinkler devices situated so as to spray water into a predetermined area, and one or more sprinkler water flow control devices for permitting or restricting flow of water to the sprinkler devices from a water supply, the deterrent system comprising:
    a detector configured to generate an intruder detection signal when an intruder is detected within a protected area to be protected from intrusion; and
    a control circuit adapted to generate a sprinkler activation signal in response to receiving said intruder detection signal from said detector, said sprinkler activation signal being used to activate said sprinkler water flow control devices so that said sprinkler device spray water into said protected area;
    wherein said control circuit further include a voltage regulator adapted to operate with an operating voltage taken from a low voltage AC supply system and a low voltage DC supply system, and which voltage regulator compensates for variations in such supply system;
    further wherein said operating voltage can vary by more than a factor or two.

9. The system of claim 8, wherein said operating voltage can vary between approximately 9 volts and 26 volts.

10. The system of claim 8, further wherein said control circuit can be controllably adjusted to delay generation of said sprinkler activation signal.

11. The system of claim 8, further wherein said control circuit generates said sprinkler activation signal for a controllable period of time corresponding to a time that such sprinkler devices spray water into said area.

12. The system of claim 8, wherein said detector used an infrared signal for detecting movement within said area.

13. The system of claim 12, wherein said infrared signal can be used under substantially varying ambient light conditions.

14. The system of claim 8, further wherein both said detector and said control circuit are powered from said operating voltage.

15. A method of deterring entrance into a protected area, the method including the steps of;
    generating an intruder detection signal when an intruder is detected within the protected area; and
    providing one or more sprinkler devices adapted to spray water within the protected area; and
    providing one or more solenoid control valves configured to control flow of water to said sprinkler devices from a water supply, so that water can be sprayed by said sprinkler devices into the protected area under control of a solenoid activation signal; and
    regulating a low power voltage supply system, which low power voltage supply system can include an AC operating voltage and a DC operating voltage that can vary by more than a factor of two and is substantially below 110 volts;
    generating a regulated operating voltage that is substantially constant despite voltage variations in said low power voltage supply system;
    providing a control circuit for generating said solenoid activation signal in response to receiving said intruder detection signal from a detector circuit, said control circuit being adapted to operate with said regulated operating voltage;

wherein said sprinkler devices can be controlled to spray water into the protected area to deter entrance by an intruder.

16. The method of claims 15, wherein said operating voltage can vary between approximately 9 volts and 26 volts.

17. The method of claim 15, further wherein said control circuit can be controllably adjusted to delay generation of said activation signal.

18. The method of claim 15, further wherein said control circuit generates said activation signal for a controllable period of time corresponding to a time that such sprinkler devices spray water into the protected area.

19. The method of claim 15, wherein said intruder detection signal is based on an infrared signal that detects heat changes within the protected area.

20. The method of claim 10, wherein said heat changes can be detected under substantially varying ambient light conditions.

* * * * *